July 28, 1959
V. F. ZAHODIAKIN
2,896,684
LOCKING SLEEVE CONTRACTABLE BY WEDGING THREADS TO ENGAGE A STUD
Filed Sept. 7, 1956
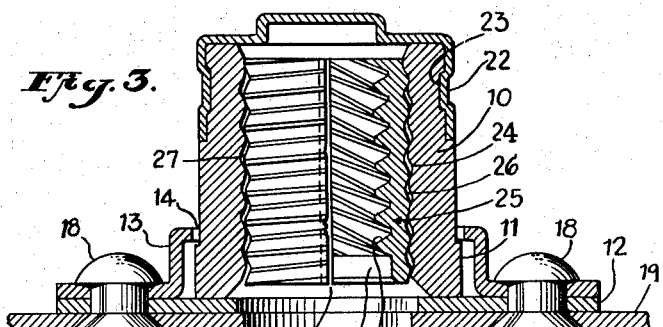
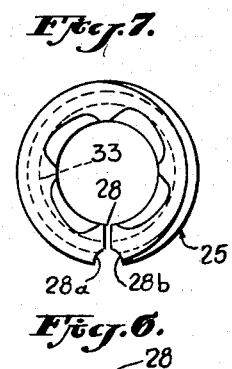
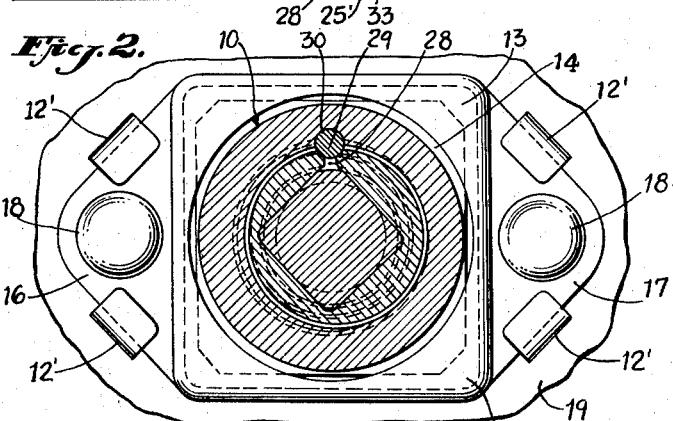
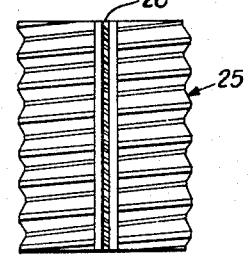
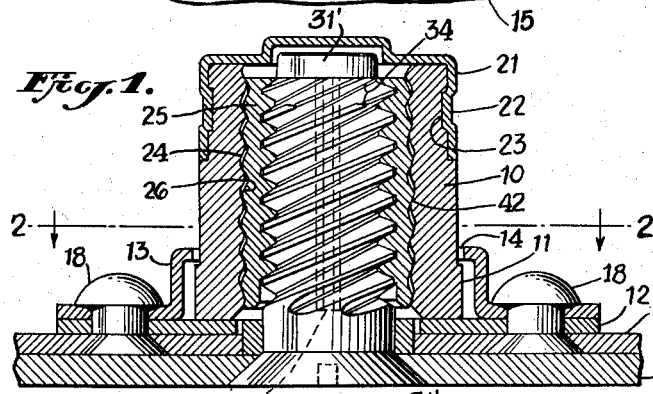
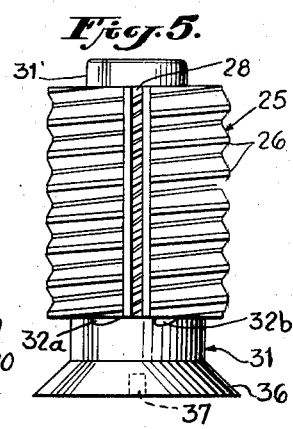
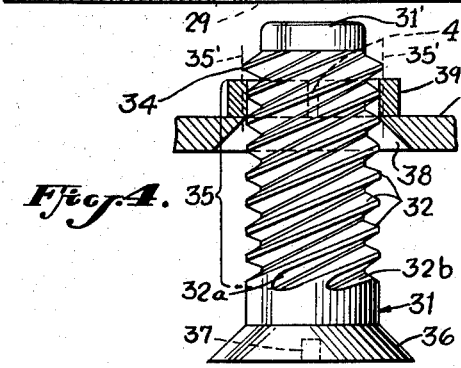
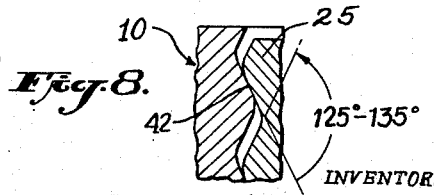
INVENTOR.
VICTOR F. ZAHODIAKIN
BY
Ward, Neal, Haselton, Orme & McElhannon
ATTORNEY.

United States Patent Office 2,896,684
Patented July 28, 1959

2,896,684

LOCKING SLEEVE CONTRACTABLE BY WEDGING THREADS TO ENGAGE A STUD

Victor F. Zahodiakin, Summit, N.J.

Application September 7, 1956, Serial No. 608,446

1 Claim. (Cl. 151—19)

This invention relates to fastening devices such as adapted for use in fastening together superposed panels or other parts of assemblies. Quickly operable devices of this general character have extensive uses in the aircraft industry and for a variety of other applications, for securing in place various parts such as plates, brackets, doors and panels, among numerous other things.

The invention has particular reference to fastening devices of the so-called rotary type, that is of a type adapted to be secured in place by relative rotation of the coacting parts.

There have been many attempts to devise fastening devices of such rotary type, but such attempts have involved a variety of difficulties. For example, some of such devices involve the use of springs or other intricate parts which easily become ineffective in operation or cannot withstand high temperatures. Others are difficult to install without the use of heavy force or special manipulations. Another difficulty with such devices as generally available heretofore resides in the fact that they are made to accommodate substantially only one specific thickness of the members to be fastened together, and if such thicknesses vary with a tolerance of more than about 0.03" for example, then component parts of different sizes have to be used. The users of such devices in many fields of work must maintain on hand a large stock of the parts of different sizes. Further difficulties inherent with prior devices of this nature are that they are excessively limited, as compared with their size, in their load-carrying ability, both in respect to shear and tension loads. And if the devices involve parts which are clamped together by the force of a spring, when the spring becomes loaded beyond the limit of its strength and collapses, the parts become disengaged with possible serious consequences, particularly if the devices are used on aircraft, among some other industries. Furthermore, such devices as heretofore available often permit some separation of the parts fastened together and as a result, relative vibration of the parts occurs, which may finally cause breakage of the device due to crystallization of the metal. Another problem has been that of a tendency of the parts of the devices to wear, and the lack of provision to compensate for wear, and when the wear exceeds certain limits, the devices may quickly become totally ineffective.

With the present invention, these difficulties are effectively overcome by the use of a combination of parts comprising an internally threaded receptacle adapted to be secured to one of the panels (or other parts) to be fastened in place, said receptacle containing a resilient split sleeve, which is initially of a somewhat contracted diameter, such sleeve being threaded externally to engage the threads inside the receptacle and threaded internally to engage a threaded stud or screw. Such stud is adapted to pass through openings in the two panels or parts to be fastened together, and the stud has a head or the like adapted to engage the second panel. The threads on the stud have a slightly greater pitch diameter as compared with the threads in the sleeve, so that when the stud is screwed into the sleeve, it will meet with uniform and strong resistance against turning and at first cause the sleeve to be forcefully expanded. Means is provided to lock the sleeve against turning with respect to the receptacle. Preferably the internal thread of the receptacle and the external thread of the sleeve are formed with a quite wide thread angle of from about 125° up to about 150°. Thus the engaging sides of the threads form radially and axially inclined complementary surfaces which are adapted to exert an inward radial wedging force on said sleeve. Then, after the stud has been screwed into place to bring the parts to be secured into firm contact, if the stud is then turned inwardly forcefully somewhat further, this will cause the external threads on the sleeve to so engage the internal threads in the receptacle that the sleeve will tend to be crowded inwardly and axially slightly with respect to the receptacle. On the other hand, if the angles of the internal threads of the receptacle and the external threads of the sleeve are made very substantially less than above specified, this axial sliding effect of the sleeve with respect to the receptacle cannot readily occur on applying the final heavy turning force to the stud, and as a result, the one part which is to be secured to another may be easily loosened and become free relatively to turn and ultimately allow the parts to loosen, vibrate and become disengaged. By utilizing said preferred thread angle, the threaded sleeve becomes forcefully compressed between the threaded stud and the internally threaded receptacle, and the parts are firmly retained together, substantially as if they were a single unit, and held against any possibility of relative rotation or vibration, while acting to clamp the two panels firmly together. Any force tending to pull the stud from the sleeve causes the external sleeve threads to so engage the internal threads of the receptacle as to cause the sleeve even more tightly to grip the threaded stud. The device can be released or taken apart only by applying a deliberate and strong turning force in a direction to screw the stud out of the sleeve, and neither vibration, excessive loads, shearing effects, nor other stresses will bring about any tendency of loosening of the parts.

Various further and more specific objects, features and advantages of the invention will appear from the description given below, taken in connection with the accompanying drawings, illustrating by way of example a preferred form of the invention.

In the drawings:

Fig. 1 is an axial sectional view of one preferred embodiment of the invention, the threaded stud therein being shown in elevation;

Fig. 2 is a sectional view taken in a plane normal to the axis on along line 2—2 of Fig. 1;

Fig. 3 is an axial sectional view of the device with the threaded stud removed and showing about one-half of the threaded sleeve in elevation and the other half in axial section;

Fig. 4 is an elevational view of the threaded stud as retained by a split ring in assembly with one of the parts or plates which are to be fastened together;

Fig. 5 is an elevational view of the threaded stud with the split tubular sleeve thereon;

Fig. 6 is a similar view of the sleeve alone;

Fig. 7 is an end view of the sleeve; and

Fig. 8 is an enlarged sectional view indicating the preferred wide angle threaded relation of the receptacle and sleeve members of the device.

Referrring now to the drawings in further detail, the receptacle portion above mentioned, is shown at 10. This portion may be formed at one end, with an annular enlargement 11 surrounded by suitable means for retaining, preferably loosely, the receptacle 10 with respect to a base plate as at 12. Such retaining means in the form shown in Figs. 1–3 inclusive, may comprise an envelope-like sheet metal member 13, formed with a central circular aperture as at 14 for receiving the cylindrical receptacle 10. Such envelope-like means may include a square or rectangular housing portion 15 surrounding the central aperture and may also be formed with a pair of lugs as at 16, 17, adapted to be secured as by rivets 18 to the sheet metal base portion 12 and to one of the plates or parts 19, to which another plate or part 20 is to be fastened by the device. This envelope-like retaining means thus retains the receptacle 10 in a "floating" relation with respect to the base 12 and the part 19, so that it will be free to move slightly in any direction to facilitate threading together the opposed portions of the device when being installed. Before the rivets 18 are put in place, the base portion 12 may be retained against the member 13 as by lugs 12' extending from the edges of member 12 and crimped about the adjacent edges of member 13.

The other end of the receptacle 10 may be closed by a sheet metal cap 21 to prevent dirt or other foreign matter or objects from entering to interfere with the operation of the device, this cap being held in place for example by crimping same inwardly circumferentially around its rim as at 22, in engagement with an annular groove 23, formed about the upper end of the receptacle 10.

The bore of the receptacle 10 is internally threaded as at 24. The thread should be of the V-type, and as above stated preferably having a relatively large angle, for example about 125° to 150°. Less satisfactory results may be obtained by using a lesser thread angle, viz. from about 110° up to 150°. The above-mentioned externally and internally threaded resilient split tubular sleeve is indicated at 25. The external threads as at 26 on this sleeve correspond as to type, angle and pitch, to the internal thread 24 on the receptacle. The sleeve 25 is made and threaded so that externally it will be of a size such that, when screwed into the receptacle, there is a substantial clearance between the threads 24 and 26, as indicated at 27 in Fig. 3. The sleeve is slotted longitudinally along one side as indicated at 28, the exterior corner portions at such slot preferably being arcuately concave as at 28a, 28b (Fig. 7) so as to conform to and receive a longitudinal pin 29, which also engages in a longitudinal groove of arcuate cross-section as at 30 formed on the threaded interior wall of the receptacle 10. One end of the bore of the sleeve is provided with a cylindrical counterbore to facilitate centralizing the stud as indicated at 25'. After the sleeve 25 has been screwed in place as shown in Fig. 3, the pin 29 may be inserted thereafter to lock the sleeve against turning with respect to the receptacle. This locking means, although preferably as shown being formed as a pin of circular cross section, may, of course, be otherwise shaped and with the grooves on the sleeve 25 and the receptacle 10 being shaped to correspond to the shape of the locking means. In this manner, the sleeve is non-rotatably mounted in the receptacle, with radially and axially inclined complementary engaging surfaces formed by the threads as shown at 42, which exert a wedging pressure on the sleeve on axial movement outward of the receptacle. The split sleeve, due to its resilient character, provides a longitudinally rigid, radially contractible and expandable resilient device which may be contracted by said wedging pressure.

The above-mentioned threaded stud is shown at 31. Preferably in order that it may be quickly screwed into place, it is formed with a plurality of threads 32, for example quadruple threads, the end portions of two of which are indicated at 32a, 32b. These threads may be of the conventional 60° angle V- or Acme types and the interior of the sleeve 25 is correspondingly threaded as at 33. However, as shown in Fig. 4, the threaded end portion 34 of the stud 31 has a major diameter slightly greater than the remaining threaded portion 35. This difference in diameters is shown by the dotted lines at 35' (Fig. 4) which, it is noted, touch portions of major diameter, but are spaced slightly from remaining thread portions of minor diameter. The screw or bolt head portion 36 of the stud is preferably formed integral, as shown, with the part of the stud which is of minor diameter and is also formed with a conventional slot 37 for receiving a screwdriver. The pitch diameter of the threads 32 on the stud is made different from and somewhat greater than the pitch diameter of the internal threads 33 of the sleeve, this difference being for example from about 0.005" to about 0.007". The threads on the stud and sleeve are otherwise complementary, the pitch and angle of the threads being the same, so that when the sleeve is expanded, the threads thereon conform to those of the stud. Accordingly, when the stud is screwed into the sleeve, the sleeve expands diametrically and therefore causes a substantially constant resistance against torque, which in turn will prevent unintended turning of the stud out of engagement with the sleeve. While the sleeve 25 may be made of various materials of adequate resiliency, it is preferably formed of high carbon steel, suitably heat-treated to be resilient. The sleeve may be formed by threading a cylindrical sleeve of the same size as the split sleeve before hardening and then hardening the sleeve by heat treatment. Thereafter the sleeve may be slit to form the resilient split sleeve. The stud 31 may be made of medium carbon steel, but preferably with its surfaces case carburized and hardened to afford suitable hardness for reducing wear upon rotatable engagement with the sleeve.

As shown in Fig. 4, the stud passes through an aperture as at 38 in a removable panel or other part 20, which is to be fastened with respect to another part or member as at 19. The stud may be retained in the aperture 38 as by a retaining ring 39, which is split along one side as at 40 to permit it to be expanded to allow the slightly enlarged end of the stud to pass therethrough, whereupon such ring will closely encircle the portion of the stud of minor diameter and thus retain the stud against movement longitudinally out of the aperture 38, while still permitting movement of the stud through considerable distances to facilitate the threading of same into the sleeve 25 and also freely permitting the stud to move axially while being threaded into place. Thus while the stud is retained in a simple way against accidentally dropping out of the aperture in the member 20, considerable portions of the stud may protrude out from the aperture 38 before the stud of the fastening device is engaged, thus permitting wide angular approach of the stud with respect to the other parts when being installed.

After installing the fastening device, as the stud is screwed into place in the sleeve, the pressure faces of the threads on the stud and sleeve engage to move the sleeve toward the head of the stud and the panels or parts 19 and 20 will be firmly drawn together, and then continued turning of the stud by the screwdriver will cause the sleeve to move inwardly and axially by an almost microscopic distance with respect to the receptacle. The internal thread 24 on the receptacle and the external thread 26 on the sleeve will then come into intimate contact with each other along the radially and axially inclined surfaces 42. These surfaces are inclined at a substantially smaller, more acute angle to the axis of rotation than the pressure faces of the threads on the stud and sleeve, thereby developing high inward radial force on axial movement. This radial force further tends to contract the sleeve about the stud and increases the frictional torque between the sleeve and stud. By reason of the initial contraction caused by the resiliency of the sleeve and the further force exerted by the inclined surfaces 42 between the sleeve and receptacle, there is at all times a frictional torque existing to resist rotation of these members, and since the initial contraction is present before the inclined surfaces on the sleeve and receptacle engage, the initial torque is independent of the inclined surfaces.

When the stud is turned counterclockwise or in a direction to remove it and to release the fastening device, the compressed sleeve will at first slightly increase in size diametrically and by continuing to turn the stud and overcoming the resistance between the stud and sleeve, the stud will be quickly withdrawn from engagement with the sleeve, permitting release of the member 20 from the member 19. At that moment, the greater portion of the stud will project outwardly with respect to the panel 20 and the sleeve 25 will contract to its original diameter. When the stud is screwed into the sleeve tightly with the panel or other parts 19, 20 firmly held together, the entire threaded portion of the stud which is engaged by the sleeve will be subject to a high and uniform radial compression at all points and the axial load will be uniformly distributed among all the engaging thread turns on the stud and sleeve, as well as those on the exterior of the sleeve and interior of the receptacle.

It will be noted that the device is well adapted for securing together parts of various different thicknesses, since if the parts are thinner or thicker than those indicated at 19—20, then the stud, when screwed to final position, will extend either further into the sleeve than shown in Fig. 1, or less far.

As shown in the various figures, the stud shank may be formed with a short cylindrical axial extension as at 31', which is integral with the stud and formed on the end thereof opposite from the head of the stud. This extension may be slightly beveled to facilitate the entrance of the projection into the bore of the sleeve. The diameter of this projection is substantially equal to the smallest diameter of the internal thread in the sleeve. When this projection enters the bore of the sleeve, it will automatically cause the stud to assume a position coaxial with the threaded sleeve and thus facilitate engagement of the thread on the stud with that in the sleeve.

It will be apparent that the device provides a construction which is simple to manufacture, which may be readily installed, and which does not require experienced workmen to operate it; and that a substantially constant and strongly effective resistance will be provided against turning of the stud out of the sleeve. All of the threads may be righthanded, or the internal threads of the sleeve and stud may be righthanded and the threads in the receptacle and the external threads of the sleeve may be lefthanded. The degree of such resistance may be varied by varying the normal diametrical dimensions of the sleeve with respect to the stud. The parts may all be such as to be capable of withstanding high temperatures, while still firmly retaining the panel parts against both axial and lateral movement, so that in use none of the parts will be subject to relative vibration or oscillation, and therefore possibilities of wear and loosening are minimized.

Although a certain particular embodiment of the invention is herein disclosed for purposes of explanation, various modifications thereof, after study of this specification, will be apparent to those skilled in the art to which the invention pertains. Reference should accordingly be had to the appended claim in determining the scope of the invention.

What is claimed and desired to be secured by Letters Patent is:

A fastening device comprising in combination: an internally threaded receptacle; an inherently contracted resilient split sleeve therein having an external thread which initially engages with a predetermined clearance the thread in the receptacle, said internal threads of the receptacle providing a wide included angle in the range of 125° to 150° to obtain releasable wedging when the sleeve and receptacle are urged axially in opposite directions, said sleeve also being internally threaded; a stud adapted for threaded engagement in said sleeve, the threads on the stud having greater pitch diameter than the internal threads in the sleeve when the sleeve is in its inherently contracted condition whereby said stud and sleeve threads are adapted to engage with frictional resistance when the stud is screwed into the sleeve and to cause the sleeve to dilate and thereby reduce said predetermined clearance, the engaging threads on said stud and sleeve having a substantially narrower included angle than the engaging threads on said receptacle and sleeve, the further rotation of the stud to screw it home moving the sleeve longitudinally to ride upon and be compressed by the taper of the external threads of the sleeve wedging against the internal threads of the receptacle; means for blocking the receptacle and sleeve against relative rotation; and said stud being formed with a tapering integral projection on the end of its shank opposite its head, said projection being coaxial with the stud and converging longitudinally away from the stud body from a diameter commensurate with the smallest diameter of the contracted internal threads in the sleeve to a lesser diameter, said projection being adapted to centralize the stud when inserted in the contracted sleeve to facilitate bringing the stud into threaded engagement with the sleeve and dilate the sleeve, the end convolution of the threads of said stud nearest said projection being of a larger major diameter than the remaining convolutions of said threads; and a resilient split ring having an inner diameter commensurate with the major diameter of said remaining convolutions but less than the major diameter of said end convolution slidably encircling the portion of the stud having threads of the remaining convolutions, said ring being releasably retained on the stud by said threaded end portion of larger major diameter when the stud is disengaged from the sleeve.

References Cited in the file of this patent

UNITED STATES PATENTS

| 377,188 | Burdick | Jan. 31, 1888 |
|---|---|---|
| 447,775 | Higbee | Mar. 10, 1891 |
| 534,850 | Bezer | Feb. 26, 1895 |
| 622,307 | Wilson | Apr. 4, 1899 |
| 1,025,702 | Larrad | May 7, 1912 |
| 1,717,789 | Larrad | June 18, 1929 |
| 1,747,082 | Reuter | Feb. 11, 1930 |
| 1,957,784 | Johnson | May 8, 1934 |
| 1,970,078 | Dillon | Aug. 14, 1934 |
| 2,398,827 | Graham et al. | Apr. 23, 1946 |
| 2,410,441 | Hattan | Nov. 5, 1946 |
| 2,426,857 | Birkenmaier | Sept. 2, 1947 |
| 2,448,902 | McKenzie | Sept. 7, 1948 |
| 2,492,115 | Crowther | Dec. 20, 1949 |
| 2,677,407 | McKenzie | May 4, 1954 |
| 2,742,938 | Neuschotz | Apr. 24, 1956 |

FOREIGN PATENTS

| 682,498 | Great Britain | Nov. 12, 1952 |